UNITED STATES PATENT OFFICE.

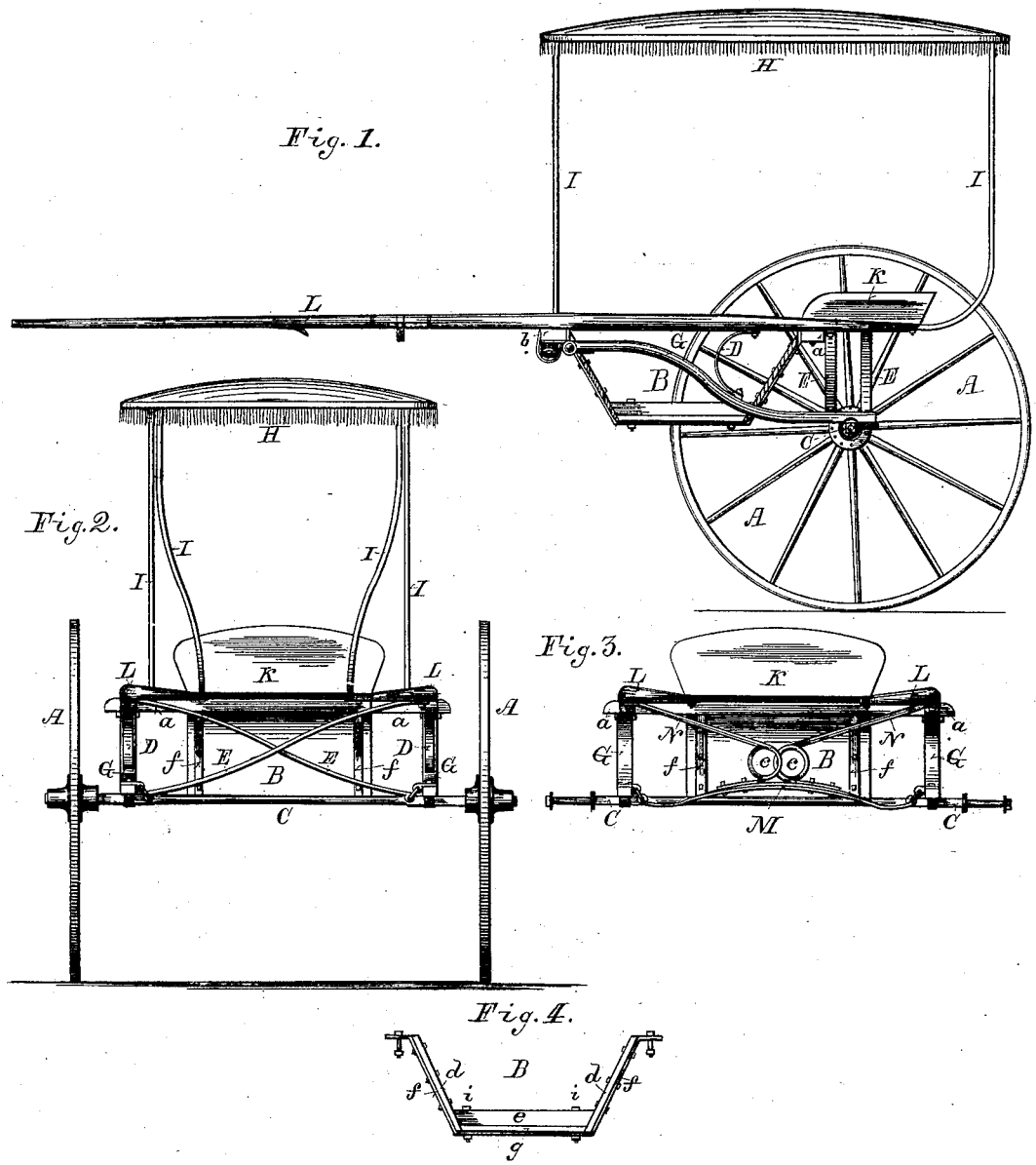

JOHN A. CHAPMAN, OF MILWAUKEE, WISCONSIN, ASSIGNOR TO THE NORTH-WESTERN SLEIGH COMPANY, OF SAME PLACE.

TWO-WHEELED VEHICLE.

SPECIFICATION forming part of Letters Patent No. 280,794, dated July 10, 1883.

Application filed August 2, 1882. (No model.)

*To all whom it may concern:*

Be it known that I, JOHN A. CHAPMAN, of Milwaukee, in the county of Milwaukee and State of Wisconsin, have invented certain new and useful Improvements in Two-Wheeled Vehicles; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to two-wheeled vehicles; and it consists in a novel construction and arrangement of the parts composing it. Its objects are, first, to produce a vehicle of such simple construction that it can be built cheaply; and, second, to so arrange and combine the parts that the same can be easily disconnected and packed in a small space for shipping, at the same time making the vehicle strong, easy riding, and light running.

In the accompanying drawings like letters refer to the same parts throughout the several figures.

Figure 1 is a side elevation of my improved cart with the front wheel removed to show more clearly the parts sustaining the seat. Fig. 2 is a rear elevation of the same. Fig. 3 shows a modified form of the spring device illustrated in Fig. 2, and Fig. 4 represents the box detached from the cart.

A A are the wheels, and C is the axle.

G G are spring-raves, made of wood or steel, clipped at their rear ends to the axle C, and bent upward and hinged at their front ends to the cross-bar $b$, to which the whiffletree is attached, and the front supports of the top.

L L are the shafts, extended at the rear to form supports for the seat K.

$a$ is a cross-bar attached at each end to the shafts L L, and so located as to form a support for the front of the seat K. The rear ends of the shafts L are bent inward and support the seat at each rear corner, as shown in Figs. 2 and 3.

E E are cross-springs, each rigidly attached at one end to the shafts, then crossed and fastened at the other end to the opposite raves, G G, by means of shackle-joints.

H is a canopy-top, supported by the upright rods I I, the front pair of which are attached to the cross-bar $b$, and the rear pair of which are so shaped as to be attached to the bottom of the seat K. By this method of attachment the top takes its motion from the shafts, which is much less jerky than that of the parts connected with the shafts, and having a motion independent of them. The advantages of this arrangement are obvious.

B is a simple box, supported by the U-shaped iron braces $ff$, the ends of which rest upon and are bolted to the cross-bars $a$ and $b$. The ends $dd$ of the box are formed of single boards, which are screwed or bolted to the braces $ff$.

The bottom $g$ is also formed of a single board, which is held in place by the sills or bed-pieces $e$, bolted through the bottom to braces $ff$ by bolts $i\,i$, as shown in Fig. 4.

D D are auxiliary C-springs, attached by their upper ends to the shafts and by their lower ends to the raves G G. By rigidly attaching the front ends of the spring-raves G G to the cross-bar $b$, or to the shafts just behind the cross-bar $b$, the spring D D may be dispensed with, as the raves will then act as springs, together with and assisting the cross-springs under the seat K.

In Fig. 3, N N are cross-springs of a modified form, which, instead of being attached directly to the raves G G, are turned near their centers into the coils $c\,c$, so that both ends of each point outward, the lower ends of which are rigidly attached to the half-elliptic spring M, which is in turn fastened at each end by shackle-joints to the raves G G. The upper ends of the same are attached to the shafts L in the same manner as shown in Fig. 2.

For the purpose of shipping, the box B may be detached from the cart, as shown in Fig. 4, by simply releasing the four bolts which secure the ends of the braces $ff$ to the cross-bars $a$ and $b$. When several vehicles are to be shipped, the boxes may be nested together, or they may be taken apart by removing the bolts $i\,i$, which will release the bottom board, $g$, and the bed-pieces $e$, and by detaching the end-boards $dd$, which will release the braces *f f*, as well as the end-boards themselves. The parts can then be packed in a comparatively small space. The top may be made to occupy a very small space by releasing the standards I I, both at the ends bolted to the cross-bar *a* and seat K and at the ends screwed into the top H, and then packing the parts together. The running part may be condensed into a much smaller compass by detaching the members composing it and connected by bolts and nuts. Thus the whole vehicle can be readily taken apart by detaching the parts joined with bolts without marring the same.

I claim—

1. In a cart or sulky, the combination of the spring-raves G G, connected at their front ends with the shafts L L and clipped at their rear ends to axle C, together with auxiliary springs E E, extending from side to side, and attached at their ends to said raves G G and shafts L L, axle C, and shafts L L, substantially as and for the purposes set forth.

2. The combination, in a cart or sulky, of the spring-raves G G, hinged at their front ends to the cross-bar *b* and clipped at their rear ends to axle C, shafts L L, extended at the rear to form supports for seat K, the auxiliary C-springs D D, inserted between said shafts and raves in front of said axle, axle C, and seat K, substantially as and for the purposes set forth.

3. In a two-wheeled vehicle, the canopy-top H, supported by the standards I I, which are attached to the shafts or parts attached to and moving with the shafts, substantially as and for the purposes set forth.

4. The combination, in a two-wheeled vehicle, of the raves G G, attached to shafts L L, cross-springs E E, auxiliary C-springs D D, and cross-bars *a* and *b*, substantially as and for the purposes set forth.

5. In a two-wheeled vehicle, the combination of shafts L L, raves G G, hinged to cross-bar *b*, cross-springs E, auxiliary C-springs D D, box B, constructed as described, seat K, and top H, supported by standards I I, substantially as and for the purposes set forth.

In testimony that I claim the foregoing as my own I affix my signature in presence of two witnesses.

JOHN A. CHAPMAN.

Witnesses:
  E. H. BOTTUM,
  CHAS. L. GOSS.